United States Patent
Sieder et al.

(10) Patent No.: US 11,649,411 B2
(45) Date of Patent: May 16, 2023

(54) APPARATUS AND PROCESS FOR PRODUCING A DEACIDIFIED FLUID STREAM

(71) Applicant: BASF SE, Ludwigshafen am Rhein (DE)

(72) Inventors: Georg Sieder, Ludwigshafen am Rhein (DE); Raquel Fernandez Rodiles, Florham Park, NJ (US); Thomas Ingram, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/251,020

(22) PCT Filed: May 31, 2019

(86) PCT No.: PCT/EP2019/064163
§ 371 (c)(1),
(2) Date: Dec. 10, 2020

(87) PCT Pub. No.: WO2019/238433
PCT Pub. Date: Dec. 19, 2019

(65) Prior Publication Data
US 2021/0213383 A1    Jul. 15, 2021

(30) Foreign Application Priority Data

Jun. 11, 2018  (EP) ..................................... 18176959
Jun. 11, 2018  (EP) ..................................... 18176963

(51) Int. Cl.
*C10L 3/10*    (2006.01)
*B01D 5/00*    (2006.01)
(Continued)

(52) U.S. Cl.
CPC ............ *C10L 3/101* (2013.01); *B01D 5/0003* (2013.01); *B01D 53/002* (2013.01);
(Continued)

(58) Field of Classification Search
CPC .............. B01D 53/002; B01D 53/1425; B01D 53/1456; B01D 2257/102;
(Continued)

(56) References Cited

U.S. PATENT DOCUMENTS

2002/0059865 A1    5/2002    Lemaire et al.
2010/0319540 A1    12/2010    Garcia Andarcia et al.

FOREIGN PATENT DOCUMENTS

CA    873791 A    6/1971
DE    102005033837 A1    1/2007
RU    2602908 C1    11/2016

OTHER PUBLICATIONS

RU-2602908-C1 English translation (Year: 2016).*
(Continued)

*Primary Examiner* — Anita Nassiri-Motlagh
(74) *Attorney, Agent, or Firm* — Faegre Drinker Biddle & Reath LLP

(57) ABSTRACT

A process for producing a deacidified fluid stream from a fluid stream comprising methanol and at least one acid gas and an apparatus for carrying out the process. The process comprising a) an absorption step in which the fluid stream is contacted with an absorbent in an absorber to obtain an absorbent laden with methanol and acid gases and an least partly deacidified fluid stream; b) a regeneration step in which at least a portion of the laden absorbent obtained from step a) is regenerated in a regenerator to obtain an at least partly regenerated absorbent and a gaseous stream comprising methanol, water and at least one acid gas; c) a recycling step in which at least a substream of the regenerated absor-
(Continued)

bent from step b) is recycled into the absorption step a); d) a condensation step in which a condensate comprising methanol and water is condensed out of the gaseous stream from step b); e) a distillation step in which at least a portion of the condensate from step d) is guided into a distillation column to obtain a top stream comprising methanol and a bottom stream comprising water; which comprises recycling at least a portion of the bottom stream from step e) into the regenerator.

14 Claims, 3 Drawing Sheets

(51) Int. Cl.
    *B01D 53/00*     (2006.01)
    *B01D 53/14*     (2006.01)

(52) U.S. Cl.
    CPC ..... *B01D 53/1425* (2013.01); *B01D 53/1456* (2013.01); *B01D 53/1475* (2013.01); *B01D 53/1487* (2013.01); *B01D 53/1493* (2013.01); *C10L 3/102* (2013.01); *C10L 3/103* (2013.01); *C10L 3/104* (2013.01); *B01D 2252/20431* (2013.01); *B01D 2252/20447* (2013.01); *B01D 2252/20489* (2013.01); *B01D 2257/102* (2013.01); *B01D 2257/602* (2013.01); *B01D 2257/80* (2013.01); *C10L 2290/08* (2013.01); *C10L 2290/44* (2013.01); *C10L 2290/541* (2013.01)

(58) Field of Classification Search
    CPC .......... B01D 2257/602; B01D 2257/80; C10L 3/102; C10L 2290/44

USPC ........................................................ 423/210
See application file for complete search history.

(56) References Cited

OTHER PUBLICATIONS

Alexandre Terrigeol, "Molecular Sieves Contaminants: Effects, Consequences and Mitigation", Gas Processors Association—Europe, May 23-25, 2012, pp. 1-14.
European Search Report for EP Patent Application No. 18176959.7, dated Dec. 4, 2018, 3 pages.
European Search Report for EP Patent Application No. 18176963.9, dated Dec. 13, 2018, 3 pages.
International Preliminary Reporton Patentability received for PCT Patent Application No. PCT/EP2019/064163, dated May 20, 2020, 17 pages (5 pages of English Translation and 5 pages of Original Document).
International Search Report and Written Opinion received for PCT Patent Application No. PCT/EP2019/064163, dated Oct. 24, 2019, 11 pages. (2 pages of English Translation and 9 pages of Original Document).
Kenneth S. Pitzer, "Chapter 3—Ion Interaction Approach: Theory and Data Correlation", Activity Coefficients in Electrolyte Solutions, 2nd Edition, 1991, pp. 75-153.
Norbert Asprion, "Nonequilibrium Rate-Based Simulation of Reactive Systems:? Simulation Model, Heat Transfer, and Influence of Film Discretization", Industrial & Engineering Chemistry Research, vol. 45, Issue 6, Feb. 8, 2006, pp. 2054-2069.

* cited by examiner

APPARATUS AND PROCESS FOR PRODUCING A DEACIDIFIED FLUID STREAM

CROSS-REFERENCE TO RELATED APPLICATIONS

This application is a national stage application (under 35 U.S.C. § 371) of PCT/EP2019/064163, filed May 31, 2019, which claims benefit of European Application Nos. 18176959.7 and 18176963.9, both filed Jun. 11, 2018, and all of which are incorporated herein by reference in their entirety.

The present invention relates to a process for producing a deacidified fluid stream, especially for producing deacidified natural gas, having a low methanol content. The present application further relates to an apparatus for deacidifying a methanol-containing fluid stream, and to the use thereof.

The removal of the acid gases from fluid streams is desirable for various reasons.

Natural gas obtained after production comprises, as well as methane, various other components such as further hydrocarbons, water, and acid gases, such as $CO_2$, $H_2S$ or mercaptans.

Crude natural gas has to be purified prior to sale as what is called sales gas, in order that it meets the specifications and demands of customers and the distribution companies.

For example, water has to be very substantially removed from natural gas since, in the event of inadequate drying of the natural gas, there can be formation of methane hydrates. The solid methane hydrates can contribute to an extreme pressure drop in the conveying conduits and block or even damage the valves and pipelines.

The drying also guarantees a uniform calorific value of the gas when it is fed into the public grid.

Moreover, acid gases such as $CO_2$, $H_2S$ and mercaptans must be removed since they are corrosive and can lead to corrosion damage in the pipelines or apparatuses in the crude natural gas processing plants. Moreover, they are, like $CO_2$ and $H_2S$, environmental pollutants that are significant causes of acid rain.

In the production of liquid natural gas (LNG), it is necessary to purify the crude natural gas prior to liquefaction; it is necessary inter alia to remove $CO_2$ down to 50 ppmv for it not to precipitate out in solid form in the liquefaction.

The crude natural gas therefore generally undergoes a multitude of purification steps before it is fed into the natural gas grid as sales gas.

Typically, a majority of the water present and natural gas condensate is initially removed. This is generally done by cooling the crude natural gas, so as to condense out water and the constituents that form the natural gas condensate, such as longer-chain alkanes and aromatics. The liquids condensed out, i.e. the natural gas condensate and water, can be separated from the nonliquefied natural gas. Water and natural gas condensate are generally separated off at or close to the deposit.

In colder regions of the earth, methanol is typically added to the natural gas before it is transported to a natural gas processing plant or else before the removal of the acid gases. Methanol acts as an inhibitor of the formation of methane hydrates in the crude natural gas. The addition of methanol to the crude natural gas thus enables the transport of the crude natural gas from the deposit to the natural gas processing plant at cold outside temperatures.

However, the addition of methanol to the crude natural gas can lead to problems in the downstream workup steps in a natural gas processing plant.

A natural gas processing plant generally comprises one or more of the following steps:
(i) deacidification;
(ii) dewatering;
(iii) removal of mercury;
(iv) removal of nitrogen;
(v) removal of natural gas condensates; and/or
(vi) liquefaction for production of LNG In the deacidification step (i), the crude natural gas is generally contacted with an absorbent that absorbs at least a portion of the acid gases, so as to obtain a deacidified natural gas and an absorbent laden with the acid gases.

In the deacidification step (i), the methanol present in the crude natural gas is generally not completely co-absorbed in the absorbent, such that the deacidified natural gas still comprises certain residual amounts of methanol before it is sent to the dewatering stage (ii). This may be the case especially when the absorbent itself comprises residual amounts of methanol. Residual amounts of methanol may be present in the absorbent when regenerated absorbent from which methanol has not been completely removed is used for deacidification.

However, residual amounts of methanol may lead to problems in the subsequent dewatering stage (ii).

The dewatering may be configured, for example, as a pressure swing adsorption (PSA), preferably as a temperature swing adsorption (TSA), or as a glycol drying operation.

If the dewatering (ii) is configured, for example, as a PSA or TSA in which a molecular sieve is used as solid desiccant, it is necessary in the case of presence of residual amounts of methanol to use a 4 A molecular sieve rather than a 3 A molecular sieve, which means that further components such as $H_2S$ and ethane are also absorbed as well as water and methanol. In addition, the absorption of methanol competes with the preferred absorption of water. The co-absorption of methane and other constituents by use of a larger molecular sieve requires the adsorber to be designed on a larger scale. Methanol may additionally lead to rapid coking of the molecular sieve in the regeneration of the molecular sieve by increasing the temperature.

Both in the case of an adsorption unit based on the PSA or TSA method and in the case of a dewatering unit based on what is called glycol dewatering, there may be entrainment of methanol through multiple plant components since the water separated off in the regeneration of the desiccant additionally comprises methanol.

The presence of methanol generally entails a further aftertreatment of the water separated oft in which methanol is separated from water, in order to recover methanol and/or water in a purity in which the substances can respectively be reused again as make-up water and inhibitor.

RU 2602908 therefore discloses a process for deacidification of crude natural gas in which a deacidified natural gas with a low MeOH content is obtained.

In this process, the MeOH-containing crude natural gas is first introduced into an absorber. In the absorber, the MeOH-containing crude natural gas is contacted with an aqueous amine solution. In this case, the predominant portion of the MeOH is also absorbed as well as the acid gases, such as $CO_2$. In a regenerator, the laden amine solution is regenerated at relatively high temperatures, with stripping of the acid gases and MeOH out of the laden amine solution. The stream obtained overhead in the regenerator is sent to a condenser in which the predominant proportion of methanol is condensed out together with the stripping steam and is separated from the acid gases remaining in the gas phase. RU 2602908 discloses the further workup of the MeOH-containing condensate from the regenerator in a downstream distillation column. The regenerator condensate is separated therein into methanol (top product) and water (bottom product). The MeOH can then be reused as inhibitor in the crude natural gas. The virtually MeOH-free water is run into a buffer vessel, where it is mixed with the regenerated absorbent to compensate for water losses, and returned to the absorber.

A disadvantage of the process described in RU 2602908 is that, in the case of recycling of the bottom stream from the methanol distillation into the absorber, it is necessary to return a virtually methanol-free bottom stream since residual amounts of methanol in the absorbent returned reduce the absorption of methanol in the absorber. The methanol content of the bottom stream of the methanol distillation is dependent, for example, on the energy input into the evaporator, the reflux ratio and the number of plates in the column. A virtually methanol-free bottom stream can be obtained either by operating the column at a high evaporator output, by establishing a high reflux ratio and/or by virtue of the column having a high number of plates. However, this increases operating costs and/or capital costs.

Similar problems can arise in the production of synthesis gas. For instance, in the production of synthesis gas by steam reforming of methane, methanol can be formed as by-product. The fluid stream may thus also include methanol as well as hydrogen and acid gases, such as $CO_2$ and CO. After at least a portion of the acid gases has been separated off by acid gas scrubbing, the deacidified synthesis gas and/or the deacidified hydrogen may also comprise residual amounts of methanol. Together with water, which can generally be introduced by an aqueous absorbent, the problems described above can likewise occur in the subsequent drying of the synthesis gas and/or hydrogen.

It was therefore an object of the present invention to produce a deacidified fluid stream, especially a deacidified natural gas, having a low MeOH content, wherein the production process required for the purpose was to have lower capital costs and operating costs.

More particularly, the present invention was to enable a high recovery rate of the methanol used as inhibitor.

In addition, it was to enable a reduction in the amounts of constituents of the absorbent, such as water, that have to be supplied in order to compensate for any losses in the process. For that reason, the process of the invention was to enable the recycling of streams from particular process steps into other process steps.

The object of the present invention was achieved by a process for producing a deacidified fluid stream from a fluid stream comprising methanol and at least one acid gas, comprising a) an absorption step in which the fluid stream is contacted with an absorbent in an absorber to obtain an absorbent laden with methanol and acid gases and an at least partly deacidified fluid stream;

b) a regeneration step in which at least a portion of the laden absorbent obtained from step a) is regenerated in a regenerator to obtain an at least partly regenerated absorbent and a gaseous stream comprising methanol, water and at least one acid gas;

c) a recycling step in which at least a substream of the regenerated absorbent from step b) is recycled into the absorption step a);

d) a condensation step in which a condensate comprising methanol and water is condensed out of the gaseous stream from step b);

e) a distillation step in which at least a portion of the condensate from step d) is guided into a distillation column to obtain a top stream comprising methanol and a bottom stream comprising water;

which comprises recycling at least a portion of the bottom stream from step e) into the regenerator.

A fluid stream comprising methanol and at least one acid gas is introduced into the process of the invention.

Figure 1:
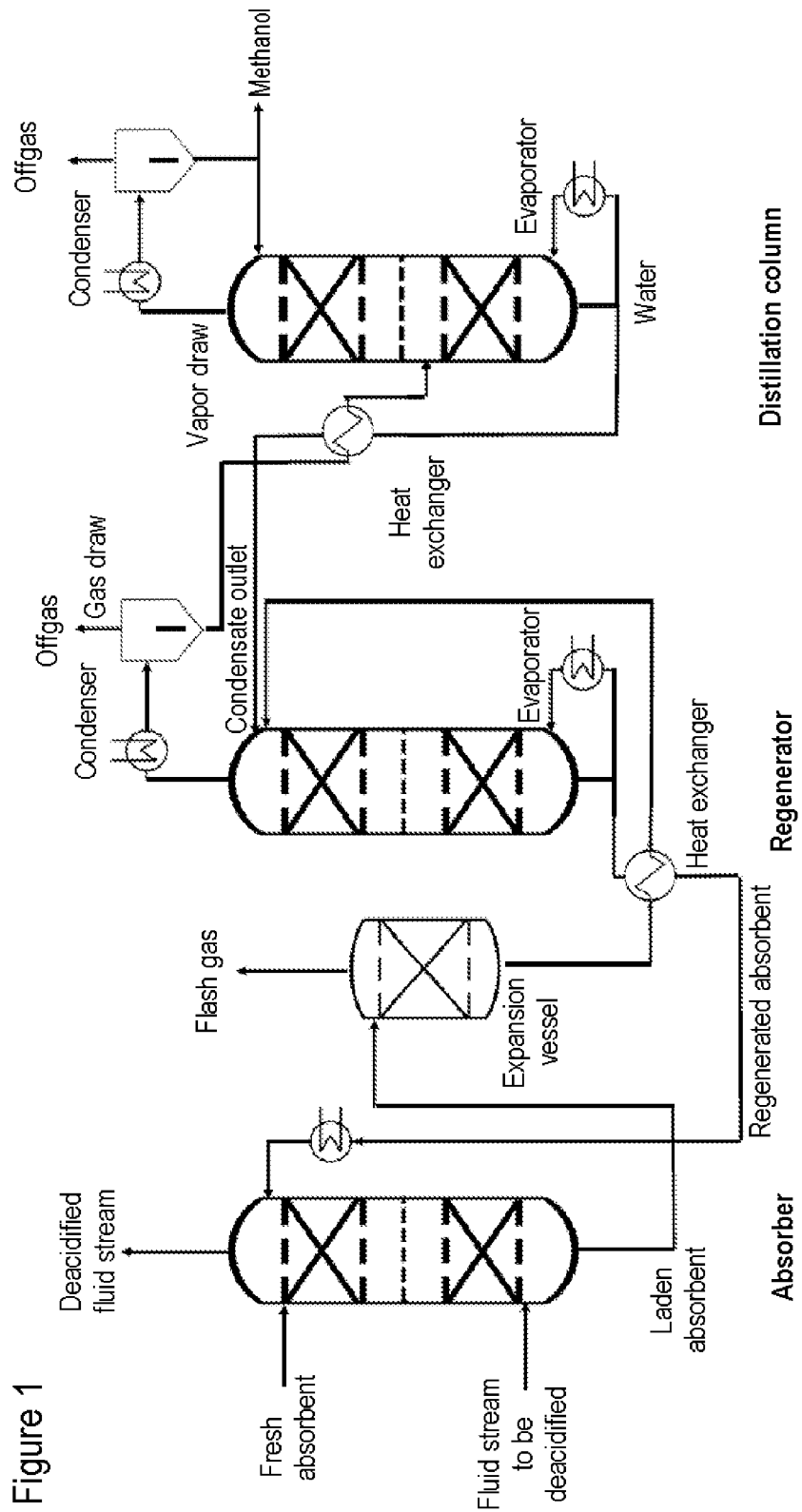
FIG. 1 shows an apparatus according to an embodiment of the invention.

The amount of methanol in the fluid stream is preferably in the range from 50 to 5000 ppmv, more preferably 100 to 1000 ppmv and most preferably 200 to 800 ppmv.

The methanol is preferably added to the fluid stream prior to step a). Methanol may alternatively be formed as by-product in the production of the fluid stream prior to step a), for example in the steam reforming of methane.

In addition, the fluid stream used comprises at least one acid gas. The crude natural gas preferably comprises $CO_2$ and/or $H_2S$. As well as $CO_2$ and/or $H_2S$, other acid gases may be present in the crude natural gas, such as COS and mercaptans. In addition, $SO_3$, $SO_2$, $CS_2$ and HCN may also be present.

The content of acid gases in the fluid stream is generally 0.01% to 40% by volume, preferably 0.05% to 15% by volume and more preferably 0.1% to 5% by volume.

The fluid stream introduced into the process of the invention may additionally comprise water.

The water content in the fluid stream is generally within a range from >0% by volume up to a content corresponding to the saturation concentration of water in the fluid stream under the existing pressure and temperature conditions.

In a preferred embodiment, the fluid stream used comprises hydrocarbons. The hydrocarbon content in the fluid stream is generally 60% to 99.9% by volume, preferably 85% to 99.5% by volume and more preferably 95% to 99% by volume.

The hydrocarbons present in the fluid stream preferably comprise 80% to 100% by volume of methane, more preferably 90% to 99.9% by volume and most preferably 95% to 99% by volume of methane.

The fluid stream may, as well as methane and acid gases, comprise further components such as other gases ($N_2$ or He), mercury or naturally occurring radioactive substances.

The proportion of further components in the fluid stream is generally 0% to 4% by volume, preferably 0.0001% to 3% by volume and most preferably 0.0005% to 1.5% by volume.

The fluid stream may be any fluid stream comprising at least one acid gas and methanol. The fluid stream is preferably crude natural gas. The fluid stream may alternatively be a synthesis gas or a biogas to which methanol has been added, or in the production of which methanol forms as a by-product. The crude natural gas used is generally a crude natural gas from which natural gas condensate and water have been separated by condensation. Natural gas condensate and water can be separated off by any of the methods known to the person skilled in the art, for example by lowering the temperature of the crude natural gas being conveyed and separating the condensed constituents, such as water and the natural gas condensate, from the uncondensed constituents of the crude natural gas.

Preference is given to using a fluid stream having a total pressure in the range from 20 to 120 bar, more preferably 40 to 100 bar and most preferably 50 to 80 bar.

Absorption Step:

According to the invention, the fluid stream is introduced into an absorption step in which the fluid stream is contacted with an absorbent in an absorber to obtain an absorbent laden with methanol and acid gases and an at least partly deacidified fluid stream.

Absorbent:

The absorbent comprises at least one amine.

The following amines are preferred:

i) amines of the formula I:

$$NR^1(R^2)_2 \qquad (I)$$

in which $R^1$ is selected from $C_2$-$C_6$-hydroxyalkyl groups, $C_1$-$C_6$-alkoxy-$C_2$-$C_6$-alkyl groups, hydroxy-$C_1$-$C_6$-alkoxy-$C_2$-$C_6$-alkyl groups and 1-piperazinyl-$C_2$-$C_6$-alkyl groups, and $R^2$ is independently selected from H, $C_1$-$C_6$-alkyl groups and $C_2$-$C_6$-hydroxyalkyl groups;

ii) amines of the formula II:

$$R^3R^4N-X-NR^5R^6 \qquad (II)$$

in which $R^3$, $R^4$, $R^5$ and $R^6$ are independently selected from H, $C_1$-$C_6$-alkyl groups, $C_2$-$C_6$-hydroxyalkyl groups, $C_1$-$C_6$-alkoxy-$C_2$-$C_6$-alkyl groups and $C_2$-$C_6$-aminoalkyl groups, and X is a $C_2$-$C_6$-alkylene group, $-X^1-NR^7-X^2-$ or $-X^1-O-X^2-$, in which $X^1$ and $X^2$ are independently $C_2$-$C_6$-alkylene groups and $R^7$ is H, a $C_1$-$C_6$-alkyl group, $C_2$-$C_6$-hydroxyalkyl group or $C_2$-$C_6$-aminoalkyl group;

iii) 5- to 7-membered saturated heterocycles which have at least one nitrogen atom in the ring and may comprise one or two further heteroatoms selected from nitrogen and oxygen in the ring, and iv) mixtures thereof.

Specific examples of amines usable with preference are:

i) 2-aminoethanol (monoethanolamine), 2-(methylamino)ethanol, 2-(ethylamino)ethanol, 2-(n-butylamino)ethanol, 2-amino-2-methylpropanol, N-(2-aminoethyl)piperazine, methyldiethanolamine, ethyldiethanolamine, dimethylaminopropanol, t-butylaminoethoxyethanol (TBAEE), 2-amino-2-methylpropanol, diisoproanolamine (DIPA);

ii) 3-methylaminopropylamine, ethylenediamine, diethylenetriamine, triethylenetetramine, 2,2-dimethyl-1,3-diaminopropane, hexamethylenediamine,1,4-diaminobutane, 3,3-iminobispropylamine, tris(2-aminoethyl)amine, bis(3-dimethylaminopropyl)amine, tetramethylhexamethylenediamine;

iii) piperazine, 2-methylpiperazine, N-methylpiperazine, 1-hydroxyethylpiperazine, 1,4-bishydroxyethylpiperazine, 4-hydroxyethylpiperidine, homopiperazine, piperidine, 2-hydroxyethylpiperidine and morpholine; and iv) mixtures thereof.

In a preferred embodiment, the absorbent comprises at least one of the amines monoethanolamine (MEA), methylaminopropylamine (MAPA), piperazine (PIP), diethanolamine (DEA), triethanolamine (TEA), diethylethanolamine (DEEA), diisopropanolamine (DIPA), aminoethoxyethanol (AEE), tert-butylaminoethoxyethanol (TBAEE), dimethylaminopropanol (DIMAP) and methyldiethanolamine (MDEA) or mixtures thereof.

Further amines that may be introduced into the process are tert-butylaminopropanediol, tert-butylaminoethoxyethylmorpholine, tert-butylaminoethylmorpholine, methoxyethoxyethoxyethyltert-butylamine, tert-butylaminoethylpyrrolidone.

The amine is preferably a sterically hindered amine or a tertiary amine. A sterically hindered amine is a secondary amine in which the amine nitrogen is bonded to at least one secondary carbon atom and/or at least one tertiary carbon atom; or a primary amine in which the amine nitrogen is bonded to a tertiary carbon atom. A preferred sterically hindered amine is t-butylaminoethoxyethanol. A preferred tertiary amine is methyldiethanolamine.

If the aim is to remove the $CO_2$ present in the fluid stream completely or virtually completely, the absorbent preferably additionally comprises an activator when the amine present in the absorbent is a sterically hindered amine or a tertiary amine. The activator is generally a sterically unhindered primary or secondary amine. In these sterically unhindered amines the amine nitrogen of at least one amino group is bonded only to primary carbon atoms and hydrogen atoms. If the aim is merely to remove a portion of the gases present in the fluid stream, for example the selective removal of $H_2S$ from a fluid stream comprising $H_2S$ and $CO_2$, the absorbent preferably does not comprise any activator.

The sterically unhindered primary or secondary amine which can be used as activator is selected, for example, from alkanolamines, such as monoethanolamine (MEA), diethanolamine (DEA), ethylaminoethanol, 1-amino-2-methylpropan-2-ol, 2-amino-1-butanol, 2-(2-aminoethoxy)ethanol and 2-(2-aminoethoxy)ethanamine, polyamines, such as hexamethylenediamine, 1,4-diaminobutane, 1,3-diaminopropane, 3-(methylamino)propylamine (MAPA), N-(2-hydroxyethyl)ethylenediamine, 3-(dimethylamino)propylamine (DMAPA), 3-(diethylamino)propylamine, N,N'-bis(2-hydroxyethyl)ethylenediamine, 5-, 6- or 7-membered saturated heterocycles having at least one NH group in the ring, which may comprise one or two further heteroatoms selected from nitrogen and oxygen in the ring, such as piperazine, 2-methylpiperazine, N-methylpiperazine, N-ethylpiperazine, N-(2-hydroxyethyl)piperazine, N-(2-aminoethyl)piperazine, homopiperazine, piperidine and morpholine.

Particular preference is given to 5-, 6- or 7-membered saturated heterocycles which have at least one NH group in the ring and may comprise one or two further heteroatoms selected from nitrogen and oxygen in the ring. Very particular preference is given to piperazine.

In one embodiment, the absorbent comprises the tertiary amine methyldiethanolamine and the activator piperazine.

The molar ratio of activator to sterically hindered amine or tertiary amine is preferably in the range from 0.05 to 1.0, more preferably in the range from 0.05 to 0.7.

The absorbent generally comprises 10% to 60% by weight of amine.

The absorbent may additionally comprise physical solvents. Suitable physical solvents are, for example, N-methylpyrrolidone, tetramethylenesulfone, oligoethylene glycol dialkyl ethers such as oligoethylene glycol methyl isopropyl ether (SEPASOLV MPE), oligoethylene glycol dimethyl ether (SELEXOL). The physical solvent is generally present in the absorbent in amounts of 1% to 60% by weight, preferably 10% to 50% by weight, especially 20% to 40% by weight.

In a preferred embodiment, the absorbent comprises less than 10% by weight, for example less than 5% by weight, in particular less than 2% by weight of inorganic basic salts, such as potassium carbonate for example.

The absorbent may also comprise additives, such as corrosion inhibitors, antioxidants, enzymes, antifoams etc. In general, the amount of such additives is in the range of about 0.01-3% by weight of the absorbent.

The absorber may be supplied with fresh absorbent, or the absorber may be supplied with absorbent regenerated in the recycling step e). The supply of fresh absorbent means that the components of the absorbent are yet to pass through steps b) to e). The supply of regenerated absorbent requires at least a portion of the components of the absorbent to have passed through steps b) to e).

The absorbent preferably comprises 0.05% by volume or less of methanol, more preferably 0.03% by volume or less of methanol, even more preferably 0.01% by volume or less of methanol and especially 0.005% by volume or less of methanol.

The absorbent is preferably aqueous. This means that the wide variety of different constituents of the absorbent, such as amine, methanol, physical solvents, additives, may be mixed with water in the amounts mentioned above.

Very particular preference is given to using an aqueous solution of methyldiethanolamine as absorbent.

Absorber:

The fluid stream is contacted with the absorbent in step a) in an absorber.

The absorber is preferably an absorption tower or an absorption column, for example a column with random packing or structured packing or a tray column.

The absorber generally comprises an absorption zone and optionally a rescrubbing zone.

Absorption Zone:

The absorption zone is deemed to be the section of the absorption column in which the fluid stream comes into mass transfer contact with the absorbent.

The fluid stream is preferably contacted in countercurrent with the absorbent in the absorption zone.

To improve contact with the absorbent and provide a large mass transfer interface, the absorption zone generally comprises internals, for example random packings, structured packings and/or trays, such as valve trays, bubble-cap trays, Thormann trays or sieve trays.

If the absorption zone comprises random packings or structured packings, the height of the random packings/structured packings of the absorption zone is preferably in the range from 5 to 20 m, more preferably in the range from 6 to 15 m and most preferably in the range from 8 to 14 m.

If the absorption zone comprises trays, the number of trays in the absorption zone is preferably in the range from 8 to 30, more preferably 12 to 25 and most preferably 15 to 23 trays.

In the case of columns with random packings or structured packings, the absorption zone may be divided into one or more sections, preferably 2 to 4 sections. Bearing and holding trays and/or distributor trays may be disposed between the individual sections of the absorption zone, and these improve the distribution of the absorbent over the entire cross section of the column.

The temperature of the absorbent introduced into the absorption zone is generally about 0 to 60° C., preferably 10 to 50° C. and more preferably 25 to 50° C.

The pressure in the absorber is typically in the range from 30 to 120 bar, more preferably 40 to 100 bar and most preferably 50 to 80 bar has.

The feed point for the fluid stream introduced is preferably below or in the lower region of the absorption zone. The feed is preferably via a gas distributor.

The absorber may comprise one or more feed points for the absorbent introduced. For instance, the absorber may comprise a feed point for fresh absorbent and a feed point for regenerated absorbent. Fresh and regenerated absorbent may alternatively be fed into the absorber together via one feed point. The one or more feed points are preferably above or in the upper region of the absorption zone. It is also possible to feed in individual constituents of the absorbent, such as make-up water, via the feed point for fresh absorbent.

If the absorber has an optional rescrubbing zone, the feed is preferably between the absorber zone and the rescrubbing zone.

The contacting of the fluid stream with the absorbent in the absorption zone affords an at least partly deacidified fluid stream and an absorbent laden with MeOH and acid gases.

In the upper region of the absorber, there is generally a draw point for the deacidified fluid stream. A demister may be mounted in the region of the draw point, in order to separate out any liquid residues of the absorbent or of the scrubbing agent from the exiting fluid stream.

There is generally a draw point for the laden absorbent in the lower region of the absorber, preferably at the bottom.

The at least partly deacidified fluid stream may optionally be contacted with a scrubbing liquid in the absorption zone.

The feed point for the scrubbing agent is preferably in the upper region or above the absorption zone.

The scrubbing liquid is more preferably an aqueous liquid. The scrubbing liquid may be a liquid intrinsic to the process, i.e. an aqueous liquid obtained elsewhere in the process, or aqueous liquids supplied from the outside. Preferably, the scrubbing liquid comprises a condensate (called absorber top condensate) formed in a downstream cooling operation on the deacidified fluid stream and/or fresh water.

By the contacting of the at least partly deacidified fluid stream with a scrubbing liquid, it is possible to scrub out entrained absorbent constituents, such as amines. The contacting with an aqueous scrubbing liquid can additionally improve the water balance of the process when more water is discharged via the exiting streams than is introduced via the entering streams.

Rescrubbing Zone:

The absorber may optionally have what is called a rescrubbing zone. In the rescrubbing zone, a scrubbing liquid is generally conducted in countercurrent to the deacidified fluid stream.

The rescrubbing zone is generally a section of the absorber above the feed point of the absorbent.

The rescrubbing zone preferably has random packings, structured packings and/or trays to intensify the contact between the fluid stream and the scrubbing liquid. The rescrubbing zone especially has trays, especially valve trays, bubble-cap trays, Thormann trays or sieve trays.

The rescrubbing zone comprises preferably 1 to 7, more preferably 2 to 6 and most preferably 3 to 5 trays, or a packing height (random packings/structured packings) of preferably 1 to 6 m, more preferably 2 to 5 and most preferably 2 to 3 m.

The scrubbing liquid is generally introduced above the rescrubbing zone or into the upper region of the rescrubbing zone. The scrubbing liquids used may be the abovementioned scrubbing liquids.

The scrubbing liquid may be recycled via the rescrubbing zone. This is achieved by collecting the scrubbing liquid below the rescrubbing zone, for example by means of a suitable collection tray, and pumping it to the upper end of the rescrubbing zone by means of a pump. The recycled scrubbing liquid may be cooled, preferably to a temperature of from 20° C. to 70° C., in particular 30° C. to 60° C. This is advantageously achieved by recirculating the scrubbing liquid through a cooler. In order to avoid any accumulation of scrubbed-out absorbent constituents in the scrubbing liquid, a substream of the scrubbing liquid is preferably discharged from the rescrubbing zone.

Specification of the Deacidified Fluid Stream:

The deacidified fluid stream, as described above, is preferably drawn off via a draw point in the upper part of the absorber.

Optionally, the deacidified fluid stream may be guided through a condenser.

Condensers used may, for example, be condensers having cooling coils or helical tubes, plate heat exchangers, jacketed tube condensers and shell and tube heat exchangers.

The condenser is generally operated at a temperature in the range from 10 to 60° C., preferably 20 to 50° C., more preferably 20 to 30° C.

The deacidified fluid stream which is obtained in step a) comprises preferably 0.01 to 10 ppmv of methanol, more preferably 0.05 to 5 ppmv of methanol and most preferably 0.1 to 3 ppmv of methanol.

The water content of the deacidified fluid stream is generally 80-100% of the saturation concentration of water in the fluid stream under the existing temperature and pressure conditions.

If the deacidified fluid stream is to be used as sales gas, the content of $H_2S$ in the deacidified fluid stream is preferably 5 ppmv or less, and the $CO_2$ content is 2% by volume or less.

If the deacidified fluid stream is to be liquefied to LNG, the $CO_2$ content in the deacidified fluid stream is preferably 100 ppmv or less and more preferably 50 ppmv or less. The $H_2S$ content in the deacidified fluid stream in the case of LNG is preferably 5 ppmv or less and more preferably 2 ppmv or less.

Further Processing:

One or more of the following workup steps are optionally conducted subsequently on the deacidified fluid stream which is obtained in step a):

aa) dewatering;
bb) removal of mercury;
cc) removal of nitrogen;
dd) removal of natural gas condensates; and/or ee) liquefaction (LNG)

The dewatering aa) is preferably conducted in the form of a pressure swing adsorption (PSA) and more preferably in the form of a temperature swing adsorption (TSA), or in the form of a glycol drying operation.

PSA or TSA can be conducted by methods known to the person skilled in the art. Standard variant procedures are described, for example, in Nag, Ashis, "Distillation and Hydrocarbon Processing Practices", PennWell 2016, ISBN 978-1-59370-343-1 or in A. Terrigeol, GPA Europe, Annual Conference, Berlin, Germany, 23rd-25th May, 2012 (https://www.cecachemicals.com/export/sites/cecaicontent/medias/downloads/products/dtm/molecular-sieves-contaminants-effects-consequences-and-mitigation.pdf).

In PSA or TSA, preference is given to using a zeolite, activated carbon or molecular sieve. Preference is given to using a molecular sieve as solid adsorbent in PSA or TSA.

In the glycol drying operation, preference is given to using a liquid absorbent such as monoethylene glycol (MEG), diethylene glycol (DEG), triethylene glycol (TEG) or tetraethylene glycol (TREG). TEG is especially preferably used as liquid absorbent.

The glycol drying operation can be conducted by process variants known to the person skilled in the art. Examples of glycol drying are likewise found, for example, in Nag, Ashis, "Distillation and Hydrocarbon Processing Practices", PennWell 2016, ISBN 978-1-59370-343-1.

The drying aa) may optionally be followed by further workup steps, such as bb) mercury removal, cc) removal of nitrogen, dd) removal of natural gas condensates and ee) liquefaction of natural gas to give LNG. Details of the aforementioned process steps can likewise be found in Nag, Ashis "Hydrocarbon Processing Practices".

The one or more purification steps aa) to dd) generally afford a fluid stream that meets the specifications of final customers and/or distribution companies and, in the case of natural gas, can be sold as sales gas or can be liquefied in a further liquefaction step ee) to give LNG.

Laden Absorbent:

Step a) additionally affords an absorbent laden with acid gases.

The laden absorbent may be fed directly to the regeneration step b).

Expansion Step (Optional):

In a particular embodiment of the process of the invention, an expansion step is first conducted on the laden absorbent before it is introduced into the regeneration step b).

In the expansion step, the laden adsorbent is generally guided into an expansion vessel.

For this purpose, in general, the laden adsorbent withdrawn at the base of the absorber is expanded through a throttle valve.

Preferably, the laden adsorbent is expanded to a pressure of 3 to 15 bar, preferably 4 to 12 and more preferably 5 to 10 bar.

The expansion generally leads to the desorption of co-absorbed hydrocarbons that go into the gas phase (called flash gas). The flash gas may be guided back into the absorption by means of a compressor, or incinerated for energy generation or flared off in situ.

The expansion vessel is generally a vessel free of any particular internals. The expansion vessel is preferably what is called a flash drum. Alternative expansion vessels include columns having internals, for example random packings, structured packings or trays.

The expansion affords a gaseous phase (flash gas).

In the upper region of the expansion vessel, there is generally a gas draw for the gases converted to the gas phase. A demister may preferably be disposed in turn in the region of the gas draw. If required, the acid gases present may be separated from the flash gas in a further absorption column. Typically, for this purpose, a substream of the regenerated solvent is supplied to the additional absorption column.

At the base of the expansion vessel, in general, the absorbent at least partly laden with the acid gases that have not been converted to the gas phase is drawn off and is generally guided into step b).

Regeneration Step:

According to the invention, the adsorbent at least partly laden with acid gases is guided into the regeneration step b).

In the regeneration step, at least a portion of the laden absorbent obtained from step a) is regenerated in a regenerator to obtain an at least partly regenerated absorbent and a gaseous stream comprising methanol, water and at least one acid gas.

Before being introduced into the regeneration step b), the adsorbent at least partly laden with acid gases is preferably guided through a heat exchanger.

In the heat exchanger, the absorbent at least partly laden with acid gases is preferably heated to a temperature in the range from 50 to 150° C., more preferably 70 to 130° C. and most preferably 80 to 110° C.

In a particular embodiment, the regenerated absorbent drawn from the bottom of the regenerator is used as heating medium in the heat exchanger. This embodiment has the advantage that the thermal energy of the regenerated absorbent from stage b) can be used to heat the laden absorbent. In this way, it is possible to further reduce the energy costs of the overall process.

Regenerator:

According to the invention, the regeneration step is conducted in a regenerator.

The regenerator is generally configured as a stripping column.

The regenerator preferably comprises a regeneration zone, an evaporator and optionally a rescrubbing zone.

The regenerator is preferably operated at a top pressure in the range from 1 to 5 bar, preferably 1.2 to 4 and more preferably 1.3 to 2.5 bar.

In the bottom of the regenerator, there is generally disposed a liquid draw for the regenerated solvent.

At the top of the regenerator, there is generally a gas draw for the gaseous stream. A demister is preferably mounted in the region of the gas draw.

According to the invention, the gaseous stream is guided into a condensation step d), as described hereinafter.

Regeneration Zone:

The regenerator generally has a regeneration zone disposed above the bottom. In the present context, the regeneration zone is regarded as the region of the regenerator with which the laden absorbent comes into contact with the steam which is raised by the reboiler.

To improve contact and provide a large mass transfer interface, the regeneration zone generally comprises internals, for example random packings, structured packings and/or trays, such as valve trays, bubble-cap trays, Thormann trays or sieve trays.

If the regeneration zone comprises structured packings or random packings, the height of the structured packings/random packings in the regeneration zone is preferably in the range from 5 to 15 m, more preferably in the range from 6 to 12 m and most preferably in the range from 8 to 12 m.

If the regeneration zone comprises trays, the number of trays in the regeneration zone is preferably in the range from 10 to 30, more preferably 15 to 25 and most preferably 17 to 23 trays. In the case of columns with random packings or structured packings, the regeneration zone may in turn be divided into multiple sections, preferably 2 to 4. Bearing and holding trays and/or distributor trays may be disposed between the sections of the regeneration zone, and these improve the distribution of liquid over the entire cross section of the regenerator.

In general, the laden absorbent is preferably introduced into the regenerator in the upper region or above it. If the regenerator has an additional rescrubbing zone, as described below, the laden absorbent is preferably introduced into the regenerator between the regeneration zone and rescrubbing zone.

In the regeneration zone, the vapor generated in the evaporator is generally run in countercurrent to the absorbent flowing downward through the regeneration zone.

The gaseous stream may be contacted with a scrubbing liquid in the regeneration zone.

If the regenerator does not have a scrubbing zone, the feed point for the scrubbing agent is preferably in the upper region or above the regeneration zone.

More preferably, the scrubbing liquid is an aqueous liquid, such as fresh water or an aqueous liquid obtained elsewhere in the process.

The temperature of the scrubbing liquid is generally in the range from 20 to 60° C., preferably in the range from 30 to 55° C. and more preferably 30 to 40° C.

In a preferred embodiment, a portion of the condensate from stage d) is used as scrubbing liquid.

In a particularly preferred embodiment is at least a portion of the scrubbing liquid of the bottom stream from step e).

More preferably, the scrubbing liquid consists exclusively of the bottom stream from step e).

Bottom:

The zone of the regenerator beneath the regeneration zone is generally referred to as the bottom.

In this region, the regenerated absorbent is typically collected and fed to the evaporator via pipelines via a liquid draw in the lower region of the regenerator and/or partly recycled into the absorber as regenerated absorbent.

The bottom may be divided by a collecting tray disposed between the bottom draw and the feed point for the steam raised in the evaporator.

Evaporator:

In general, at least a portion of the regenerated absorbent is guided from the bottom draw of the regenerator into an evaporator.

Preferably, the bottom draw from the regenerator is guided completely into the evaporator.

The evaporator is typically a reboiler (kettle evaporator), natural circulation evaporator (thermosiphon) or forced circulation evaporator.

The evaporator of the regenerator is preferably disposed outside the regenerator and connected to the bottom draw via pipelines.

The evaporator is generally operated at temperatures in the range from 100 to 150° C., preferably 105 to 140° C. and most preferably 110 to 130° C.

In the evaporator, in general, at least a portion of the bottom draw is evaporated and returned to the regenerator. The steam raised and unevaporated liquid are preferably fed in beneath the regeneration zone, preferably into the bottom of the regenerator.

If an additional collecting tray is disposed in the bottom, the steam raised is preferably fed in beneath the collecting tray.

Rescrubbing Zone:

In a particular embodiment, the regenerator has a rescrubbing zone above the regeneration zone, especially preferably above the feed point for the laden absorbent.

The rescrubbing zone generally takes the form of a section of the regenerator disposed above the regeneration zone.

The rescrubbing zone preferably has internals, especially random packings, structured packings and/or trays to intensify the contact between the fluid stream and the scrubbing liquid.

In a preferred embodiment, the internals are random packings and/or structured packings. The packing height (random packings/structured packings) is preferably within a range from 1 to 10, more preferably 2 to 8 and most preferably 3 to 6 m.

In a very particularly preferred embodiment, the rescrubbing zone has trays, especially valve trays or bubble-cap trays.

The scrubbing section preferably has 1 to 10, more preferably 2 to 7 and most preferably 2 to 6 trays.

A scrubbing liquid is generally introduced into the upper region of the rescrubbing zone or above the rescrubbing zone.

The scrubbing liquid used is generally an aqueous or slightly acidic aqueous solution, especially water.

In a particularly preferred embodiment is at least a portion of the scrubbing liquid of the bottom stream from step e). More preferably, the scrubbing liquid consists exclusively of the bottom stream from step e).

In a further embodiment, a portion of the condensate from step d) may be guided into the rescrubbing zone as scrubbing liquid.

The temperature of the scrubbing liquid is generally in the range from 10 to 60° C., preferably in the range from 20 to 55° C. and more preferably 40 to 50° C.

In the rescrubbing zone, entrained residual amounts of amines may be scrubbed out of the absorbent, such that the acidic offgas leaving the regenerator is essentially free of amines. In the rescrubbing zone, the water content of the gas stream which is obtained at the top of the regenerator may additionally be reduced since the contact with the colder scrubbing agent can result in condensation of a portion of the vaporous water. This has the advantage that this water need not be removed in the subsequent distillation step.

Recycling Step c):

According to the invention, the regenerated absorbent obtained at the bottom of the regenerator from step b) is returned to the absorption step a).

The regenerated absorbent is recycled here, as described above, in one of the feed points of the absorber for the regenerated absorbent.

Condensation Step d):

According to the invention, the gaseous stream from the regenerator is introduced into a condensation step d).

In the condensation step, a condensate comprising methanol and water is condensed out of the gaseous stream from step b).

The condensation step is preferably conducted in such a way that the gaseous stream from stage b) is guided through one or more condensers (regenerator top condensers).

In a preferred embodiment, the gaseous stream from stage b) is guided through one regenerator top condenser.

The top condenser generally comprises a heat exchanger and a vessel in which the liquid phase can be separated from the gas phase. However, heat exchanger and vessel may also be integrated in one component.

The regenerator top condenser is generally operated in such a way that water and methanol condense, while the acid gases remain predominantly in the gas phase.

Regenerator top condensers used may, for example, be condensers having cooling coils or helical tubes, jacketed tube condensers and shell and tube heat exchangers.

The regenerator top condenser is generally operated at a temperature in the range from 10 to 60° C., preferably 20 to 55° C., more preferably 30 to 40° C.

In a further preferred embodiment, the gaseous stream from stage b) is guided through two regenerator top condensers.

Preferably, the first two regenerator top condenser is cooled with air or cooling water and the second two regenerator top condenser is cooled with a coolant.

The first regenerator top condenser is generally operated at a temperature in the range from 20 to 60° C. and preferably 25 to 45° C.

The second regenerator top condenser is generally operated with a coolant at a temperature in the range from 3 to 20° C., preferably 5 to 15° C., more preferably 5 to 10° C.

The embodiment with at least two top condensers also has the advantage that the methanol content in the acidic offgas can be reduced since more methanol can be condensed out at lower temperatures. This can increase the methanol recovery rate, for example to more than 80%, based on the methanol introduced into the process. In addition, it is possible to increase the purity of the methanol obtained.

The uncondensed gas phase is preferably discharged from the process as offgas.

According to the invention, at least a portion of the regenerator top condensate is guided into the distillation step e). It is preferable here that, when multiple condensers are used, the condensates are combined before being introduced into stage e).

Preferably 50% to 100% by volume, more preferably 70% to 100% by volume, especially preferably 90% of 100% by volume, of the regenerator top condensate, and most preferably 100% by volume, is guided into the distillation step e).

The top condensate not introduced into step e) may be returned to the regenerator as scrubbing liquid.

The recycling of the top condensate into the regenerator can preferably be effected here together with the bottom stream from stage e) into the regenerator.

Distillation Step e):

According to the invention, the condensation step d) is followed by a distillation step e) in which at least a portion of the condensate from step d) is guided into a distillation column to obtain a top stream comprising methanol and a bottom stream comprising water.

The distillation step e) is generally conducted in a rectification column.

The rectification can be effected in apparatuses known to those skilled in the art, such as bubble-cap tray columns, sieve tray columns or columns having random packings or structured packings.

The rectification column preferably comprises 3 to 25 plates, more preferably 5 to 20 plates and most preferably 7 to 15 plates.

The input into the rectification column is preferably fed in in a spatial region between 25% and 95% of the plates of the rectification column (counted from the bottom), more preferably in a spatial region between 40% and 60% of the plates of the rectification column. For example, the can be effected in the region of the middle of the plates.

The energy required for the rectification is typically introduced by an evaporator in the bottom of the column. This evaporator is typically a reboiler, natural circulation evaporator or forced circulation evaporator.

In the preferred embodiment, therefore, the absolute pressure at the top of the rectification column is preferably in the range from 1 to 5 bar, more preferably 1 to 4 bar and especially preferably 1.1 to 3 bar.

At the appropriate pressures, the temperatures at the top of the rectification column are generally in the range from 50 to 80° C., preferably 55 to 75° C. and more preferably 60 to 70° C.

The gaseous stream drawn off at the top of the rectification column is generally guided through a condenser.

The condenser is preferably operated at a temperature in the range from 10 to 50° C., preferably 20 to 45° C. and especially preferably 30 to 40° C.

Condensers used may, for example, be condensers having cooling coils or helical tubes, jacketed tube condensers, plate heat exchangers and shell and tube heat exchangers.

A condensate comprising predominantly methanol is generally obtained in the condenser.

The condensate obtained in the condenser is preferably returned as reflux to the top of the rectification column to an extent of more than 50% by volume, preferably to an extent of more than 65% by volume and most preferably to an extent of more than 80% by volume.

The unrecycled condensate can be discharged from the process and reused as inhibitor for prevention of methane hydrate formation in the crude natural gas.

At the bottom of the rectification column, a bottom stream comprising predominantly water is generally drawn off.

The bottom stream from step e) preferably comprises methanol in the range from 10 ppmw to 5 wt %, more preferably 100 ppmw to 3 wt % and most preferably 200 ppmw to 1 wt % of methanol.

Recycling of the bottom stream from distillation step e):

According to the invention, at least a portion of the bottom stream from distillation step e) is returned to the regenerator which is used in step b).

Preferably 50% to 100% by volume, more preferably 70% to 100% by volume and most preferably 90% to 100% by volume of the bottom stream from distillation step e) is recycled into the regenerator. In a preferred embodiment, the bottom stream from distillation step e) is returned completely (100% by volume) to the regenerator. This can reduce the feeding-in of fresh water to maintain the water balance in the overall process.

If the regenerator does not have an additional rescrubbing zone, the bottom stream from distillation step e) is preferably returned to the upper region or above the regeneration zone via a feed point.

If the regenerator does have an additional rescrubbing zone, the bottom stream from distillation step e) is preferably returned to the upper region or above the rescrubbing zone via a feed point. The introduction of the bottom stream from step e) into the regenerator is preferably effected as described above.

The bottom stream from step e) is preferably introduced as scrubbing water into the upper region or above the regeneration zone or, when a rescrubbing zone is present, into the rescrubbing zone, as described above.

It is optionally possible to additionally introduce fresh water into the regenerator together with the bottom stream from stage e). The introduction can be effected via the same feed point. Water can alternatively be introduced via a separate feed point.

However, preference is given to conducting exclusively condensate from stage e), without fresh water, into the regenerator, as described above.

In a preferred embodiment, the bottom stream from stage e) is used as heating medium in a heat exchanger before the bottom stream from step e) is recycled into the regenerator. Preferably, the bottom stream from step e) is utilized as heating medium in the heat exchanger that heats the regenerator top condensate from stage d) before it is guided into the distillation step e). This embodiment leads to a reduction in the energy demand.

Apparatus:

The present invention additionally relates to an apparatus for deacidifying a fluid stream, comprising methanol and at least one acid gas, according to claim 1, comprising
a) an absorber comprising an absorption zone, at least one feed for absorbent, a feed for the fluid stream to be deacidified, a liquid draw for the laden absorbent, a gas draw for the deacidified fluid stream and optionally a rescrubbing zone with a feed for scrubbing agent;
b) a regenerator comprising a regeneration zone, an evaporator, a feed for the laden absorbent, a liquid draw in the bottom of the regenerator and a gas draw in the top region of the regenerator;
c) at least one top condenser connected to the gas draw of the regenerator, comprising a gas draw and a condensate outlet; and
d) a distillation column comprising a condenser, an evaporator, a feed for the condensate outlet of the top condenser, a vapor draw in the top region of the column and a liquid draw at the bottom of the distillation column,
wherein the regenerator has a feed connected to the liquid draw at the bottom of the distillation column.

A preferred embodiment of such an apparatus is depicted in FIG. 1.

Figure 2:
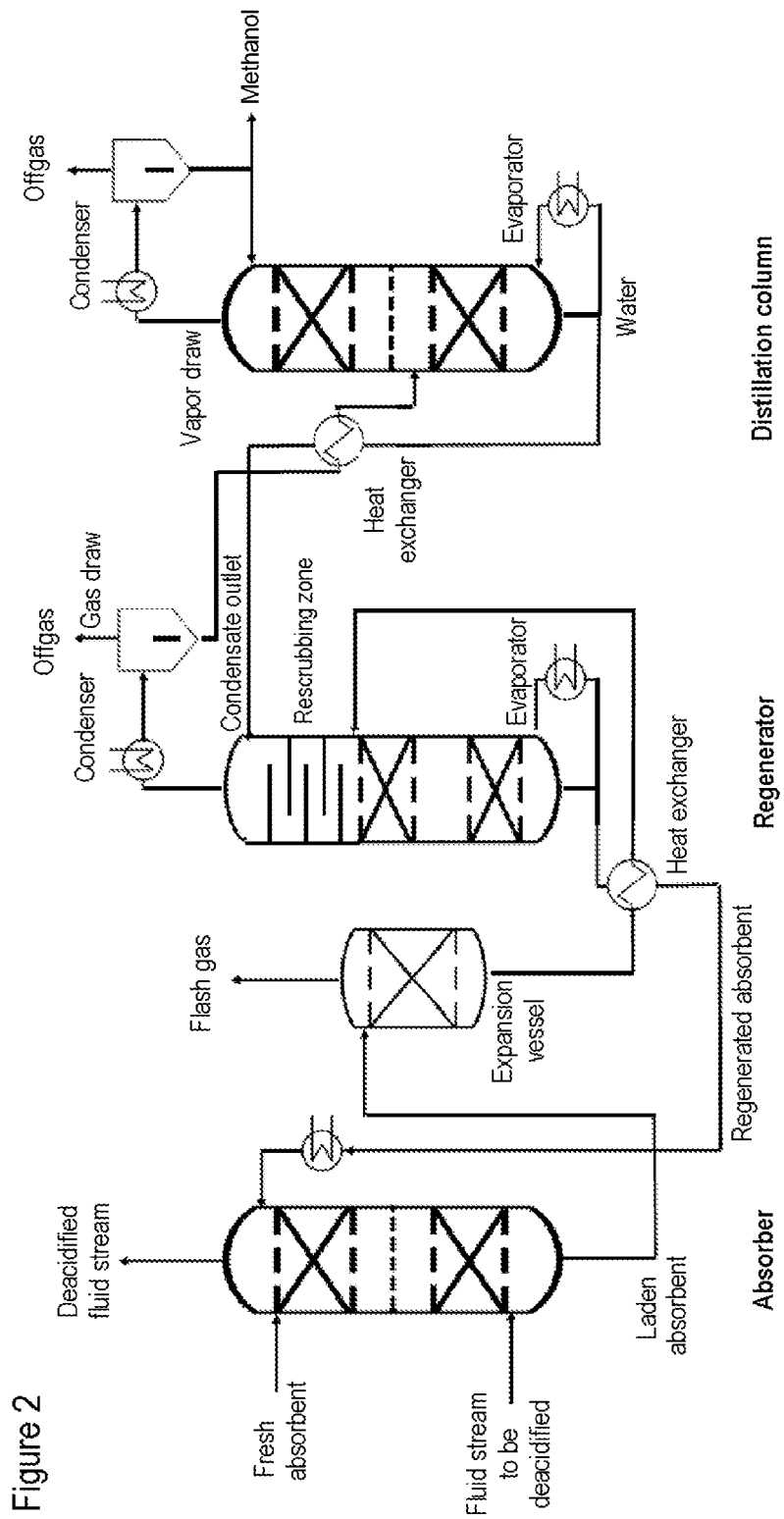
FIG. 2 shows an embodiment according to the invention in which the regenerator additionally comprises a rescrubbing zone.

FIG. 2 shows a preferred embodiment in which the regenerator additionally comprises a rescrubbing zone.

The absorber is preferably configured as an absorption column or absorption tower.

The absorption column preferably has an absorption zone. In the context of the present invention, the absorption zone is deemed to be the section of an absorption column in which the fluid stream comes into mass transfer contact with the absorbent. To improve contact and provide a large mass transfer interface, the absorption zone preferably comprises internals, preferably random packings, structured packings and/or trays.

In a column having random packing or structured packing, the absorption zone is preferably divided into two to four packing sections arranged one on top of another that are separated from one another by bearing and holding trays and/or a distributor tray.

If the absorption zone comprises random packings or structured packings, the height of the structured packings/random packings in the absorption zone is preferably in the range from 5 to 20 m, more preferably in the range from 6 to 15 m and most preferably in the range from 8 to 14 m.

If the absorption zone comprises trays, the number of trays in the absorption zone is preferably in the range from 8 to 30, more preferably 12 to 25 and most preferably 15 to 23 trays.

Below or in the lower region of the absorption zone, there is a feed for the fluid stream to be deacidified.

Above the absorption zone, preferably at the top of the absorption column, there is preferably a draw point for the deacidified fluid stream.

A demister is preferably mounted in the region of the draw point for the deacidified fluid stream.

In a particularly preferred embodiment, there is a feed point for scrubbing agent in the upper region or above the absorption zone.

In a very particular embodiment, the absorber comprises an additional rescrubbing zone above the absorption zone.

The rescrubbing zone is generally configured as a section of the absorber in the form of a rectifying section disposed above the feed point for the absorbent. The rescrubbing zone preferably has random packings, structured packings and/or trays to intensify the contact between the fluid stream and the scrubbing liquid. The rescrubbing zone especially has trays, especially valve trays, bubble-cap trays, Thormann trays or sieve trays.

There is preferably a feed point for scrubbing agent above the rescrubbing zone.

The rescrubbing zone comprises preferably 1 to 7, more preferably 2 to 6 and most preferably 3 to 5 trays, or a packing height (random packings or structured packings) of preferably 1 to 6 m, more preferably 2 to 5 and most preferably 2 to 3 m.

A collecting tray may be disposed beneath the rescrubbing zone, on which scrubbing liquid can be collected and recycled. The recycling is generally effected here by means of a pump that pumps the scrubbing liquid from the collecting tray to the feed point. In the case of recycling, the scrubbing liquid may be cooled by means of a heat exchanger.

There is preferably a liquid draw for the laden absorbent in the lower region of the absorber.

In a preferred embodiment, there is a heat exchanger between the liquid draw for the laden absorbent in the absorber and the feed for the laden absorbent in the regenerator. The heating medium used for this heat exchanger is preferably the recycle stream of the regenerated absorbent from the bottom of the regenerator to the absorber. In this preferred embodiment, the energy demand of the overall process can be reduced.

The liquid draw from the absorber is preferably connected via a heat exchanger to the regenerator b) via pipelines.

The heat exchanger may be configured as a plate heat exchanger or shell and tube heat exchanger. The heating medium used in the heat exchanger is preferably the bottom stream from the regenerator b).

The regenerator comprises a regeneration zone, an evaporator, a feed for the laden absorbent, a liquid draw in the bottom of the regenerator and a draw point in the top region of the regenerator.

In the present context, the regeneration zone is regarded as the region of the regenerator with which the laden absorbent comes into contact with the steam which is raised by the reboiler.

To improve contact and provide a large mass transfer interface, the regeneration zone preferably comprises internals, preferably random packings, structured packings and/or trays.

In a column having random packing or structured packing, the regeneration zone is preferably divided into two to four packing sections arranged one on top of another that are separated from one another by bearing and holding trays and/or a distributor tray.

If the regeneration zone comprises random packings or structured packings, the height of the random packings/structured packings in the regeneration zone is preferably in the range from 5 to 15 m, more preferably in the range from 6 to 12 m and most preferably in the range from 8 to 12 m.

If the regeneration zone comprises trays, the number of trays in the regeneration zone is preferably in the range from 10 to 30, more preferably 15 to 25 and most preferably 17 to 23 trays. The feed for the laden absorbent is generally above or in the upper region of the regeneration zone.

The regenerator additionally comprises an evaporator. The evaporator is preferably a reboiler, natural circulation evaporator or forced circulation evaporator.

The evaporator is preferably connected to a liquid draw at the bottom of the regenerator via a pipeline. The bottom generally refers to the region beneath the regeneration zone.

The vapor-liquid mixture generated in the evaporator is preferably introduced into the lower region of the regenerator via a feed point above the liquid draw at the bottom but below the regeneration zone.

In a further preferred embodiment, the bottom of the regenerator is divided by a collecting tray. The absorbent collected therein is supplied to the heat exchanger. The steam is fed in and the liquid is recycled beneath the collecting tray.

The regenerator additionally comprises a draw point for the gaseous stream formed in the regeneration. The draw point for the gaseous stream formed in the regeneration is preferably disposed in the top region of the regenerator. There is preferably a demister in the region of the draw point.

In a particularly preferred embodiment, the regenerator further comprises a rescrubbing zone. The rescrubbing zone is generally configured as a section of the regenerator in the form of a rectifying section disposed above the regeneration zone or the feed point for the laden absorbent. To improve contact and provide a large mass transfer interface, the rescrubbing zone preferably comprises internals, preferably random packings, structured packings and/or trays.

Especially preferably, the scrubbing section comprises trays, such as valve trays, bubble-cap trays, Thormann trays or sieve trays.

The rescrubbing zone preferably has 1 to 10, more preferably 2 to 7 and most preferably 2 to 6 trays.

When the rescrubbing zone has structured packings or random packings, the height of the internals is preferably in the range from 1 to 10 m, even more preferably 2 to 8 m and especially preferably 3 to 6 m.

There is preferably a feed for scrubbing liquid above or in the upper region of the rescrubbing zone.

The draw point for the gaseous stream formed in the regeneration is connected to a top condenser. The top condenser comprises a gas draw and a condensate outlet.

Condensers used may, for example, be condensers having cooling coils or helical tubes, jacketed tube condensers and shell and tube heat exchangers.

In a preferred embodiment, the apparatus of the invention comprises at least two condensers with one gas draw and one condensate outlet each, wherein the first condenser is preferably cooled with air or cooling water and the second condenser is preferably cooled with a coolant. This embodiment has the advantage that the methanol content in the acidic offgas can be reduced since more methanol can be condensed out. This can increase the methanol recovery rate, for example to more than 80%, based on the methanol introduced into the process.

The apparatus of the invention additionally comprises a distillation column comprising a condenser, an evaporator, a feed for the condensate outlet of the top condenser, a vapor draw in the top region of the column and a liquid draw at the bottom of the distillation column.

The distillation column is preferably configured as a bubble-cap tray column or sieve tray column, or preferably as a column with random packings or structured packings. The internals may be disposed in one or more beds. The rectification column preferably comprises 3 to 25 plates, more preferably 5 to 20 plates and most preferably 7 to 15 plates.

The feed for the condensate outlet of the top condenser is preferably fed in in a spatial region between 25% and 95% of the plates of the rectification column (counted from the bottom), more preferably in a spatial region between 40% and 60% of the plates of the rectification column. For example, the feed may be in the region of the middle of the plates.

There is preferably a liquid draw at the bottom of the distillation column.

The liquid draw is preferably connected to an evaporator via a pipeline.

The evaporator is preferably a reboiler, natural circulation evaporator or forced circulation evaporator.

The vapor-liquid mixture generated in the evaporator is preferably introduced into the bottom of the distillation column via a vapor feed.

The vapor draw is preferably in the top region of the rectification column.

The vapors formed in the distillation are guided via a pipeline to a top condenser. The top condenser generally comprises a heat exchanger and a vessel in which the liquid phase can be separated from the gas phase.

Condensers used may, for example, be condensers having cooling coils or helical tubes, jacketed tube condensers and shell and tube heat exchangers.

A condensate comprising predominantly methanol is generally obtained in the condenser.

The condensate obtained in the condenser is preferably returned via a pipeline to the top of the rectification column to an extent of more than 50% by volume, preferably to an extent of more than 65% by volume and more preferably to an extent of more than 80% by volume.

The unrecycled condensate can be discharged from the process via a pipeline and reused as inhibitor for prevention of hydrate formation at low temperatures.

According to the invention, the regenerator has a feed connected to the liquid draw at the bottom of the distillation column.

If the regenerator does not have a scrubbing zone, the feed point is preferably above or in the upper region of the regeneration zone.

If the regenerator does have a scrubbing zone, the feed point is preferably above or in the upper region of the scrubbing zone.

In a further preferred embodiment, a heat exchanger is disposed between the liquid draw at the bottom of distillation column c) and the feed to the regenerator. In this heat exchanger, the bottoms discharge from distillation column c) is utilized as heating medium for the condensate output from the top condenser of the regenerator before the condensate output is introduced into the distillation column c).

In a particularly preferred embodiment, the apparatus of the invention comprises an expansion vessel.

The expansion vessel is connected to the absorber a) and the regenerator b).

The liquid draw from the bottom of the absorber is preferably connected via a valve to the expansion vessel.

In the expansion vessel, at least a portion of the acid gases in the laden absorbent is converted to the gas phase and separated from the unevaporated liquid phase.

The gas phase is generally drawn off as acidic offgas in the upper region of the expansion vessel and discharged from the process.

In the lower region of the expansion vessel, there is preferably a liquid draw for the unevaporated liquid phase which is connected to the regenerator via a pipeline. The feed point for the liquid phase from the expansion vessel is preferably above the regeneration zone.

More preferably, a heat exchanger is disposed between the expansion vessel and the regenerator, which is operated with the bottoms discharge from the regenerator as heating medium.

Use of the Apparatus:

The present invention further relates to the use of the apparatus of the invention and of one of its preferred configuration forms, or combinations of the preferred configuration forms, for production of deacidified natural gas with a low methanol content. Such an apparatus may especially be used in countries and regions in which the climatic circumstances require inhibition of hydrate formation with methanol.

The apparatus can be used according to the above-described process conditions.

Advantages:

The apparatus of the invention, the inventive use thereof and the process of the invention in which the bottom stream from stage e) is recycled into the regenerator have the advantage over the introduction into the absorber known from the prior art that the bottom stream from stage e) can have a higher residual methanol content.

In distillation step e), compared to the prior art, the rectification column can be built with fewer plates or operated with lower evaporator output. In this way, it is possible to reduce operating costs and/or capital costs.

The process of the invention additionally has the advantage that the methanol fed in as inhibitor can be recovered at a high rate, preferably more than 80%, based on the methanol fed in. This can further reduce the operating costs of the overall process.

In the context of the invention, it has been found that, surprisingly, in the case of introduction of the bottom stream from stage e) into the regenerator in accordance with the invention, there is only a small degree of absorption, if any, in the regenerated absorbent.

The regenerated absorbent thus has such a low content of methanol that the methanol which is introduced into step a) with the fluid stream to be deacidified can be removed virtually completely. It is thus possible to optimally utilize recycle streams and to reduce the supply of constituents of the absorbent to compensate for losses.

The removal of the methanol from the deacidified fluid stream has the advantage that the problems that occur in the presence of methanol can be reduced in downstream workup steps.

If the subsequent dewatering is configured, for example, as a PSA or TSA in which a molecular sieve is used as a solid desiccant, a 3 A molecular sieve rather than a 4 A molecular sieve are used, since the adsorption of water does not compete with the adsorption of methanol. As a result, there is also no absorption of further components, such as $H_2S$ and ethane. This enables a smaller design of the dewatering stage. In the case of regeneration of the molecular sieve by increasing the temperature, a low methanol content leads to low carbonization of the molecular sieve.

If the glycol drying is configured, for example, as what is called a TEG unit (TEG=triethylene glycol), the presence of methanol makes it difficult to regenerate TEG. These disadvantages can likewise be reduced by the process of the invention or the apparatus of the invention and the use thereof.

In both cases (PSA/TSA and glycol drying), the entrainment of methanol through multiple plant components is reduced. More particularly, the water removed in the regeneration of the desiccant comprises less methanol, as a result of which it is optionally possible to reduce or avoid the complexity involved in a further workup of the water removed.

EXAMPLES

The invention is illustrated by the following examples:
The examples are based on calculations performed using a simulation model. The phase equilibria were described using a model by Pitzer (K. S. Pitzer, Activity Coefficients in Electrolyte Solutions 2nd ed., CRC Press, 1991, Chapter 3, Ion Interaction Approach: Theory). The simulation of the absorption processes is described by means of a mass transfer-based approach; details of this are given in Asprion (Asprion, N.: Nonequilibrium Rate-Based Simulation of Reactive Systems: Simulation Model, Heat Transfer, and Influence of Film Discretization, Ind. Eng. Chem. Res. (2006) 45(6), 2054-2069). The distillation column was designed by means of a thermodynamic model based on the NRTL approach for the description of the vapor-liquid equilibrium of water-methanol.

All pressures reported in the present document are absolute pressures.

In the present document "m³ (STP)/h" is the volume flow rate reported in standard cubic meters per hour. A standard cubic meter is based on a temperature of 273.15 K and a pressure of 1.01325 bar. All values reported in the unit "% by volume" are likewise based on these conditions.

The following process conditions were assumed for all examples:
Feed gas: 1.0% by volume of $CO_2$, 520 ppmv of methanol, balance: hydrocarbons ($CH_4$, $C_2H_6$), at a temperature of 26° C. and a pressure of 63.5 bar.
Absorbent:
An amine solution consisting of piperazine and methyldiethanolamine with a total amine content of 40% by weight. 0.24 m³/h of regenerated absorbent is used for every 1000 m³ (STP)/hr of feed gas. The regenerated absorbent has a temperature of 35° C.
The internals in the absorption column are random packings having a total bed height of 14 m.
In the regenerator, random packings are likewise used for the regeneration zone, with a bed height of 10 m. The regenerator is operated at a pressure of 1.5 bar.
The distillation column is operated at a pressure of 1.25 bar. In the simulation, the column is modeled by means of 10 theoretical plates. The feed is at the 6th plate counted from the bottom.

All examples have to fulfill the same separation task defined in the following specifications:
The methanol content of the deacidified fluid stream (natural gas) which is obtained at the top of the absorber is not to exceed a value of 1 ppmv.
The $CO_2$ content of the deacidified fluid stream (natural gas) which is obtained at the top of the absorber is not to exceed a value of 15 ppmv.
The methanol recovered at the top of the methanol distillation is to have a purity of greater than 96% by weight.

Only the difference with regard to distillation step e) will be discussed hereinafter since no significant differences arise with regard to the essential operating parameters in the absorption, regeneration, condensation and recycling steps a) to d).

Example 1

A process is simulated in a plant according to FIG. 1. The process consists of an absorption column, an expansion vessel (HP flash), regenerator with evaporator, and top condenser. The liquid stream (methanol+water) condensed out in the top condenser is fed through a heat exchanger in a further column. Methanol (top product) and water (bottom product) are separated here by distillation. The bottom product is returned to the top of the regenerator.

The reflux ratio v of the distillation column is 7.5.
The methanol recovery is 90% based on the amount present fluid stream introduced into stage a).

Example 2

A process is simulated in a plant according to FIG. 2. The configuration corresponds very substantially to example 1, except that a rescrubbing section with three trays was additionally included in the regenerator.

All further components and also the process conditions are unchanged compared to example 1. The inclusion of the rescrubbing zone in the regenerator, with equal evaporator output supplied for the regenerator and also the methanol distillation, likewise leads to a methanol recovery of 90%. The rescrubbing section allows the amine content in the condenser of the regenerator and hence in the distillation section to be reduced; as well as the amines dissolved in the gas, possible droplet entrainment through the rescrubbing section is also reduced.

Comparative Example 1

Figure 3:
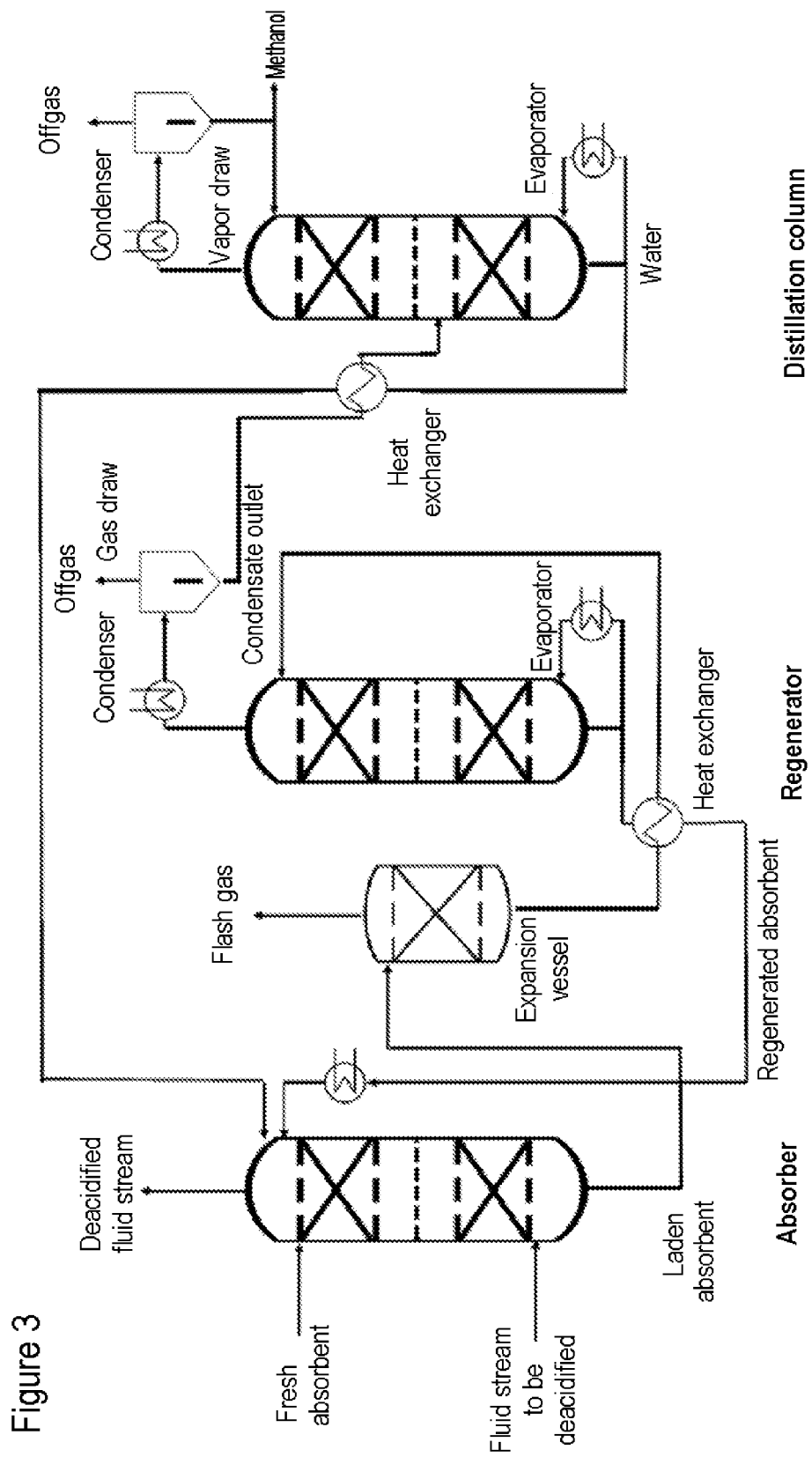
FIG. 3 shows an apparatus according to a comparative example.

Based on patent application RU2602908, a further simulation for a process was created according to FIG. 3. The crude gas stream to be purified is identical to the two examples detailed above; the apparatus sizes and evaporator outputs used (regenerator and distillation) were also kept constant. The essential difference lies in the recycling of the water from the methanol distillation directly to the top of the absorption column, and not, as before, to the top of the regenerator. Given the same number of plates and evaporator output in the methanol column, it is no longer possible with this configuration to achieve the desired methanol content (<1 ppmv) in the purified natural gas. The residual methanol content is 27 ppmv. In other words, in order to achieve the same removal of methanol, it would be necessary to use a distillation column having more plates and/or higher evaporator output.

The invention claimed is:
1. A process for producing a deacidified fluid stream from a fluid stream comprising methanol and at least one acid gas, comprising
   a) an absorption step in which the fluid stream is contacted with an absorbent in an absorber to obtain an absorbent laden with methanol and acid gases and an at least partly deacidified fluid stream;
   b) a regeneration step in which at least a portion of the laden absorbent obtained from step a) is regenerated in a regenerator to obtain an at least partly regenerated absorbent and a gaseous stream comprising methanol, water and at least one acid gas;
   c) a recycling step in which at least a substream of the regenerated absorbent from step b) is recycled into the absorption step a);
   d) a condensation step in which a condensate comprising methanol and water is condensed out of the gaseous stream from step b);
   e) a distillation step in which at least a portion of the condensate from step d) is guided into a distillation column to obtain a top stream comprising methanol and a bottom stream comprising water;

which comprises recycling at least a portion of the bottom stream from step e) into the regenerator.

2. The process according to claim 1, wherein the fluid stream introduced into the process comprises methanol in the range from 50 to 5000 ppmv.

3. The process according to claim 1, wherein the fluid stream introduced into the process comprises hydrocarbons and the hydrocarbons introduced into the process comprise in the range from 90% to 99.5% by volume of methane, and/or wherein the fluid stream introduced into the process comprises acid gases in the range from 0.01% to 40% by volume.

4. The process according to claim 1, wherein an additional expansion step is conducted between absorption step a) and regeneration step b).

5. The process according to claim 1, wherein 50% to 100% by volume of the bottom stream from step e) is recycled into the regenerator.

6. The process according to claim 1, wherein the at least a portion of the bottom stream from step e) is recycled into the upper region or above the regeneration zone of the regenerator in step b), or wherein the regenerator in step b) comprises a regeneration zone and a rescrubbing zone and the laden absorbent is introduced between regeneration zone and rescrubbing zone and at least a portion of the bottom stream from step e) is recycled into the upper region or above the rescrubbing zone.

7. The process according to claim 1, wherein the pressure at the top of the distillation column in step e) is in the range from 1 to 3 bar.

8. The process according to claim 1, wherein the distillation column in step e) has 3 to 25 plates.

9. The process according to claim 1, wherein the distillate obtained in the condenser of the distillation column in step e) is recycled to an extent of more than 50% by volume as reflux to the distillation column.

10. The process according to claim 1, wherein the condensation step d) comprises at least two condensers, the first condenser being cooled with air or cooling water and the second condenser being cooled with a coolant.

11. The process according to at claim 6, wherein the rescrubbing zone of the regenerator has trays or random packings or structured packings, and the number of trays is in the range from 1 to 10 trays or the height of the random packings/structured packings is in the range from 1 to 10 m.

12. The process according to claim 1, wherein the absorbent is an aqueous absorbent.

13. The process according to claim 1, wherein one or more of the following workup steps are performed on the deacidified fluid stream from step a):
   aa) dewatering;
   bb) removal of mercury;
   cc) removal of nitrogen;
   dd) removal of natural gas condensates; and/or
   ee) liquefaction.

14. An apparatus for deacidifying a fluid stream, comprising methanol and at least one acid gas, according to claim 1, comprising
   a) an absorber comprising an absorption zone, at least one feed for absorbent, a feed for the fluid stream to be deacidified, a liquid draw for the laden absorbent, a draw point for the deacidified fluid stream and optionally a rescrubbing zone with a feed for scrubbing agent;
   b) a regenerator comprising a regeneration zone, an evaporator, a feed for the laden absorbent, a liquid draw in the bottom of the regenerator and a gas draw in the top region of the regenerator;
   c) at least one top condenser connected to the gas draw of the regenerator, comprising a gas draw and a condensate outlet; and
   d) a distillation column comprising a condenser, an evaporator, a feed for the condensate outlet of the top condenser, a vapor draw in the top region of the column and a liquid draw at the bottom of the distillation column,
wherein the regenerator has a feed connected to the liquid draw at the bottom of the distillation column.

* * * * *